(12) United States Patent
Batushansky

(10) Patent No.: US 11,359,811 B2
(45) Date of Patent: *Jun. 14, 2022

(54) SYSTEM AND METHOD FOR A DIRECT EMISSION AND DIFFUSION OF HIGH-PRESSURE COMBUSTION WITH EXHAUST INTO FEED-WATER FROM A COMBUSTION BARREL

(71) Applicant: Paul Batushansky, Brooklyn, NY (US)

(72) Inventor: Paul Batushansky, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/345,351

(22) Filed: Jun. 11, 2021

(65) Prior Publication Data

US 2021/0302019 A1    Sep. 30, 2021

Related U.S. Application Data

(63) Continuation-in-part of application No. 16/701,090, filed on Dec. 2, 2019, now Pat. No. 11,143,397.

(51) Int. Cl.
*F23R 3/02* (2006.01)
*F23D 14/22* (2006.01)
(Continued)

(52) U.S. Cl.
CPC ............ *F23R 3/02* (2013.01); *F01K 3/00* (2013.01); *F01K 13/006* (2013.01);
(Continued)

(58) Field of Classification Search
CPC .. F23R 3/02; F01K 3/00; F01K 13/006; F22B 37/008; F22B 1/003; F23C 3/004; F23C 2900/99008; F23C 2900/9901; F23D 14/22; F23D 14/32; F23J 15/06; F23K 2203/002; F23L 2900/07005; Y02E 20/30; Y02E 20/34
See application file for complete search history.

(56) References Cited

U.S. PATENT DOCUMENTS 5,636,623 A * 6/1997 Panz .................. F24H 1/107
                                           122/31.2
8,518,132 B2   8/2013 Rettenmaier
(Continued)

FOREIGN PATENT DOCUMENTS

GB         160517 A  *  3/1921  ............. F22B 1/265
GB        2226962 A  *  7/1990  ............. F01K 9/00

*Primary Examiner* — Mark A Laurenzi
*Assistant Examiner* — Mickey H France
(74) *Attorney, Agent, or Firm* — Patent Ventures, LLC

(57) ABSTRACT

A combustion system with surface-less heat energy exchange for efficient heat energy capture and lower pollutant emission, comprising: a first line feeding an oxygen-rich reactive; a second line feeding a hydrogen fuel; a vessel containing feed-water, a combustion enclosure without a bottom wall submersed into the feed water contained in a vessel, the combustion enclosure configured to receive the feed from each of the first and second line and combust a mixture of the two feeds in a pocket formed between an inner top and side walls of the combustion enclosure and a top surface of the feed-water contained in the vessel; and the combustion within the pocket yielding a high temperature and pressure combustion product and by-product directly into the feed-water of the vessel.

14 Claims, 6 Drawing Sheets

(51) Int. Cl.
*F23J 15/06* (2006.01)
*F23D 14/32* (2006.01)
*F01K 3/00* (2006.01)
*F23C 3/00* (2006.01)
*F01K 13/00* (2006.01)
*F22B 37/00* (2006.01)
*F22B 1/00* (2006.01)

(52) U.S. Cl.
CPC ............ *F22B 37/008* (2013.01); *F23C 3/004* (2013.01); *F23D 14/22* (2013.01); *F23D 14/32* (2013.01); *F23J 15/06* (2013.01); *F22B 1/003* (2013.01); *F23C 2900/9901* (2013.01); *F23C 2900/99008* (2013.01); *F23K 2203/002* (2013.01); *F23L 2900/07005* (2013.01); *Y02E 20/30* (2013.01); *Y02E 20/34* (2013.01)

(56) References Cited

U.S. PATENT DOCUMENTS

| | | |
|---|---|---|
| 8,785,808 B2 | 7/2014 | Foret |
| 8,882,991 B2 | 11/2014 | Kuechler et al. |
| 9,051,522 B2 | 6/2015 | Jancker et al. |
| 9,114,406 B2 | 8/2015 | Betzer Tsilevich |
| 9,448,073 B2 | 9/2016 | Stracke, Jr. |
| 10,188,119 B2 | 1/2019 | Foret |
| 2003/0000218 A1* | 1/2003 | Ranasinghe ............ F02C 7/224 60/772 |

* cited by examiner

SYSTEM AND METHOD FOR A DIRECT EMISSION AND DIFFUSION OF HIGH-PRESSURE COMBUSTION WITH EXHAUST INTO FEED-WATER FROM A COMBUSTION BARREL

FIELD OF INVENTION

The invention pertains generally to the field of flue gas exchange systems in the context of boilers, and more particularly to an exchange of flue gas directly from a high combustion open chamber into a vessel.

BACKGROUND OF INVENTION

Conventional boilers produce fume as a by-product of combustion, in which the conventional systems distribute these fumes into a flue, in order to be bypassed to the outside environment (FIG. 1). Though not rampant, condensing boilers entered the market roughly three decades ago to address this lost heat energy. Condensing boilers achieve this function through at least one or an assembly of heat exchangers (FIG. 2). Furthermore, condensing boilers have the added feature of high-grade stainless-steel heat exchangers, which are resistant to the corrosive chemical residual in the condensed liquid. As a result of these features, portions of the escaping heat energy is recaptured in the form of radiant heating, resulting in more efficiency and positive environmental outcomes by emitting less flue gas, and as a corollary, less carbon dioxide. However, these systems with heat exchangers are extremely expensive due to the price of components and the extensive assembly required: Flue gas flows upward through a series of integrated heat exchangers, each comprising flue gas control valves, thermal insulation, drain shut-off valves, and piping for connecting. More notably, these non-direct heat exchange systems—whether featuring tube, shell, or plate heat exchangers—do not adequately capture heat energy, with most systems still losing 20-30% of heat energy in non-exchanged, emitted flue gas. Direct heat exchange systems are disclosed in the prior art (FIG. 3); however, they still describe the flue gas passing through a packed column or zone, allowing for the temperature differential across mediums to help condense the flue gas. This passage still resulting in a loss of heat energy capture, with any excess flue gas exhausted out, as is the case with the conventional and condenser boilers currently on the market. More recently, the use of enriched oxygen and oxy-firing combustion (pure oxygen), or high-pressure oxy-firing combustion (HiProx), have resulted in increased combustion and thermal efficiency. However, unfortunately, they have not achieved perfect thermal efficiency due to the continued use of surfaced heat exchangers. Thus, there is a need for improved heat energy exchange of flue gas for creating more efficient systems—with greater energy capture, lower carbon emission, and cheaper fittings.

SUMMARY

The invention resides in enabling a direct emission and diffusion of combustion and exhaust (c/e) directly into a feed-water vessel for surface-less heat energy exchange, thereby (1) increasing heat energy capture; (2) lowering pollutant emission; and (3) not requiring a series of heat exchangers.

Advantageously, a surface-less heat exchange enables a more efficient combustion-mediated system for power or heat energy. The lack of a surface, whether the walls of pipe or composite-stacked tubular column, ensures the lack of non-capture of heat energy across the surface of the walls. By emitting and diffusing the c/e directly into the feed-water of the vessel, a higher percentage of the heat energy may be captured. Additionally, there is a far lower risk of exhaust pollutants from corrupting the feed-water due to the cleaner combustion of an oxygen-rich reactive, whether it be enriched or pure oxygen. As a result, there is a lower need to exhaust the by-products into the environment through a flue or related structure, thereby leading to lower carbon emission into the environment.

It is one object of the present disclosure to provide a system to enable a more efficient combustion system via a surface-less heat exchange, wherein an oxygen-rich reactive is combusted and directly emitted/diffused into the feed-water of the vessel. Provided is a combustion system with surface-less heat energy exchange for efficient heat energy capture and lower pollutant emission, comprising: a first line feeding an oxygen-rich reactive; a second line feeding a hydrogen fuel; a vessel containing feed-water; a combustion barrel without a bottom wall submersed into the feed-water contained in a vessel, the combustion barrel configured to receive the feed from each of the first and second line and combust a mixture of the two feeds in a pocket formed between an inner top and side walls of the combustion barrel and a top surface of the feed-water contained in the vessel; and the combustion within the pocket yielding a high temperature and pressure combustion product and by-product directly into the feed-water of the vessel.

It is another object of the present disclosure to provide for a combustion-mediated power generation system by coupling to the above system a steam turbine configured to receive a resulting steam from the combustion via a line in communication with the feed-water from the vessel, wherein the steam turbine converts the steam into a power source; and a condenser to receive any remaining steam to form a steam condensate, the condensate formed and fed through a pipe gravitationally back to the feed-water to replenish the feed-water vessel with pre-warm water.

It is yet another object to provide for a method for a high-pressure enriched and/or pure oxygen combustion with direct emission and diffusion of the high-pressure combustion and exhaust into a feed-water vessel comprising the steps of: receiving a feed from each of a first and a second line and combust a mixture of the two feeds in a pocket formed between an inner top and side walls of a combustion barrel and a top surface of a feed-water contained in a vessel; yielding a high temperature and pressure combustion product and by-product directly into the feed-water of the vessel; receiving into a steam turbine a resulting steam from the combustion via a line in communication with the feed-water from the vessel, wherein the steam turbine converts the steam into a power source; and condensing any remaining steam to form a steam condensate by a condenser, said condensate formed and fed through a pipe gravitationally back down to the feed-water to replenish the feed-water vessel with pre-warm water.

It is a final object to provide for a combustion barrel, without a bottom wall and submersed into the feed-water contained in a vessel. The barrel is further configured to receive the feed from each of the first and second line and combust a mixture of the two feeds in a pocket formed between an inner top and side walls of the combustion barrel and a top surface of the feed-water contained in the vessel; and the combustion within the pocket yielding a high temperature and pressure combustion product and by-product directly into the feed-water of the vessel.

DETAILED DESCRIPTION

Figure 1:
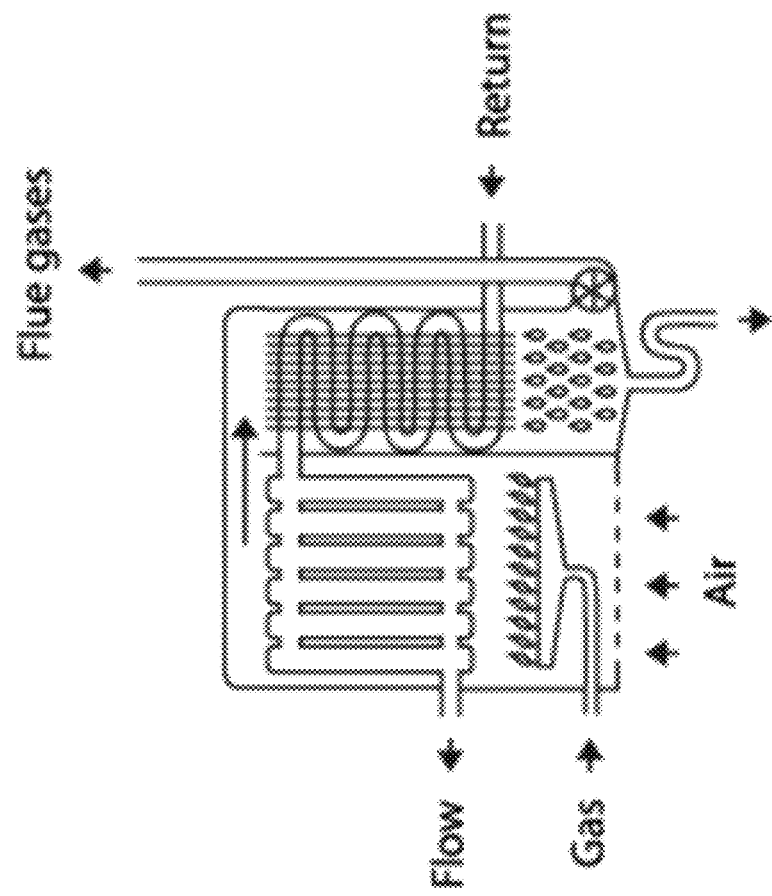
FIG. 1 depicts a three-dimensional perspective of a conventional standard boiler system in accordance with exemplary prior art.
Figure 2:
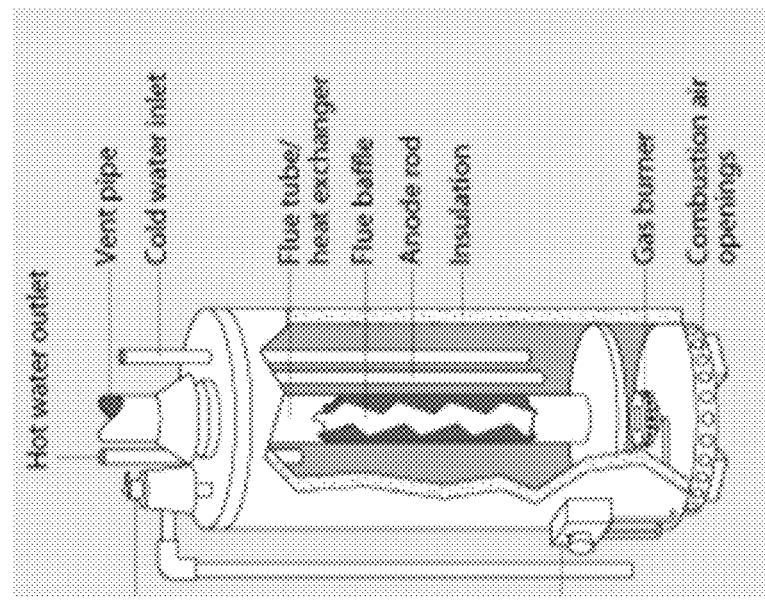
FIG. 2 depicts a three-dimensional perspective of a conventional condenser boiler with heat exchange assembly performing non-direct heat exchange in accordance with exemplary prior art.
Figure 3:
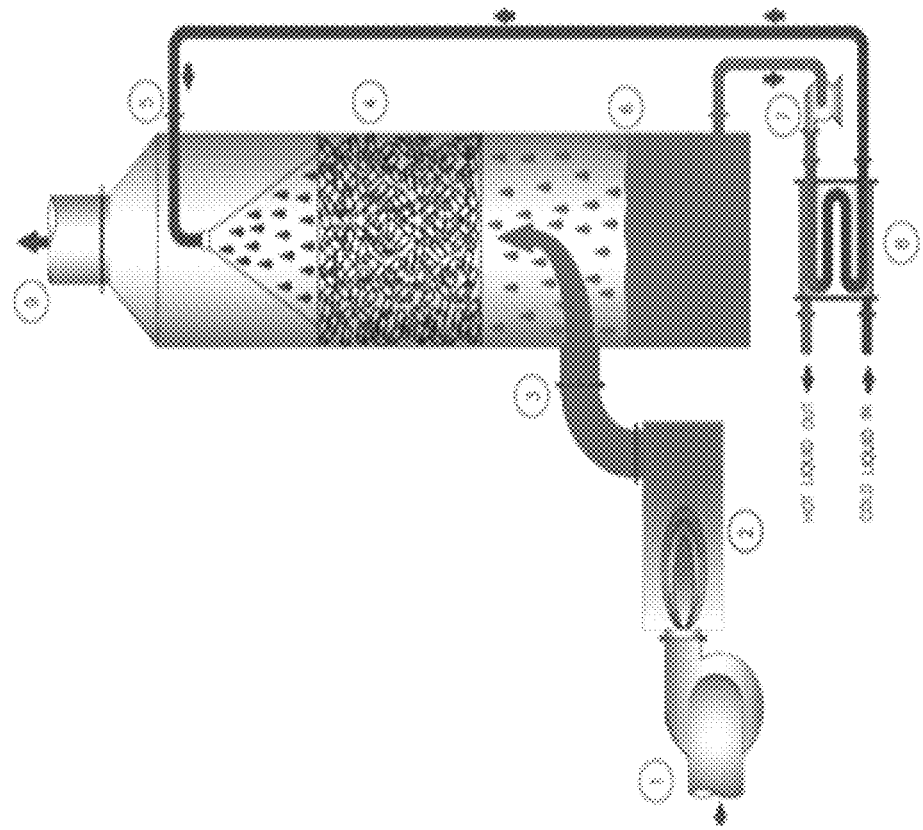
FIG. 3 illustrates a schematic representation of direct heat exchange in accordance with an aspect of the prior art.
Figure 4:
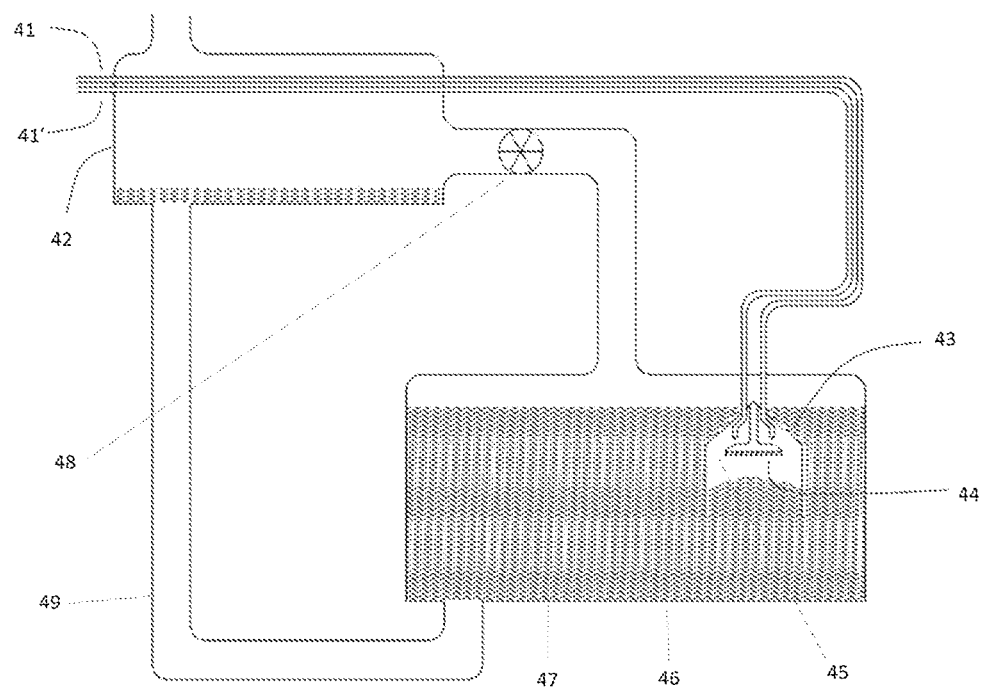
FIG. 4 depicts schematically one or more aspects of the direct emission and diffusion of combustion and exhaust into a feed-water vessel achieving surface-less heat energy exchange in accordance with an aspect of the invention.

FIG. 4 depicts schematically one or more aspects of the direct emission and diffusion of combustion and exhaust into a feed-water vessel achieving surface-less heat energy exchange in accordance with an aspect of the invention. As depicted in FIG. 4, a feed-line or pipeline 41 dedicated for each of the oxidant mixture and hydrogen fuel is illustrated. As illustrated, each of the two feed-lines 41, 41' run through a condenser 42 as a means to cool or further cool the condenser 42 to cool the trapped steam on the gravitational-return back to the feed-water 47 in the vessel 46 via a return pipe 49.

In a preferred embodiment, illustrated and disclosed is a power generation system with surface-less heat energy exchange for efficient heat energy capture and lower pollutant emission. The system comprises a first line 41 feeding an oxygen-rich reactive (enriched or purified); a second line 41' feeding a hydrogen fuel; a vessel 46 containing feed-water 47 (optionally, any solvent or medium capable of diffusing exhaust and capturing thermal energy from the exhaust); and a combustion barrel 43 without a bottom wall submersed into the feed-water 47 contained in a vessel 46. The combustion barrel 43 is configured to receive the feed from each of the first 41 and second line 41' and combust a mixture of the two feeds in a pocket 44 formed between an inner top and side walls of the combustion barrel 43 and a top surface of the feed-water 47 contained in the vessel 46. The combustion within the pocket 44 yielding a high temperature and pressure combustion product and by-product is fed directly into the feed-water 47 of the vessel 46, at which point, steam via a line in communication with the feed-water 47 from the vessel 46 is channeled into a steam turbine 48, configured to receive the steam, and wherein the steam turbine 48 is further configured to convert the steam into a power source. Finally, a condenser 42 is configured to receive any remaining steam to form a steam condensate, at which point, the condensate is formed and fed gravitationally through a return pipe back to the feed-water 47 to replenish the feed-water vessel 47 with pre-warm water. Pressure in the return water pipe should be greater than the pressure in the feed-water vessel. This is achieved by the pipe height ratio versus feed-water vessel pressure. For vessel pressure of 15 PSI, return vertical pipe must be greater than 34.65 feet (1 PSI=2.31 feet). For vessel pressure of 110 PSI, standard for steam power plant operation, vertical return pipe must be greater than 253.74 feet. This would allow return water to enter into the pressurized vessel for continuous loop operation (water to steam/steam to water).

Shut-off valves, control valves, pumps, or dampers are incorporated as needed to control fluid or gas flow through the system. Fluid or gas flow can be controlled in terms of flow rate and direction by opening, closing, or varying the size of the valve-controlled passage—signaled from a control system.

The oxygen-enriched combustion within the feed-water 47 combustion barrel 43 may be achieved by being fed an oxidant mixture through a dedicated feed or pipe-line 41. The oxygen concentration in the oxidant mixture may be pure or enriched, wherein the pure concentration is more than 90% by volume in the oxidant mixture and the enriched concentration is more than that of ambient air, but less than 90% by volume. Alternatively, liquid oxygen may be fed, or vacuum pressure swing units to remove nitrogen, thereby increasing oxygen content. This oxidant mixture is fed through the condenser 42 via its dedicated feed-line 41 in parallel with the hydrogen fuel feed line 41' to further aid in the cooling of the condenser 42. After exiting the condenser, the feed-lines 41, 41' running parallel to one another eventually terminate into the combustion barrel 43. Each of the feeds from each of the dedicated feed-lines 41, 41' may be atomized and dispensed through a nozzle under high pressure as a mist or spray; the pressure being higher than that of any one of a selected combustion operation pressure within the barrel. Furthermore, the spray from each of the feeds come into contact and are ignited by a spark from an ignition means or burner 44 residing within the pocket 45 of the combustion barrel 43. The oxygen supply may be delivered from a remote location or regenerated on site by an air separation unit. Moreover, the use of oxygen and the resulting higher temperatures and pressure allow for a wider range of hydrogen fuel options compared to traditional combustion.

As shown in FIG. 4, the feed lines 41, 41' may terminate within the air pocket 45 of the combustion barrel 43, wherein the feed-lines 41 branch or fork out and terminate at a distal end with the nozzle. Alternatively, the feed lines 41, 41' may terminate at distal end—branching or forking in such a way that the nozzles face one another to aid in the feed combination or mixture. In yet another alternative embodiment, the feed lines 41, 41' fork may occur supra the top surface of the combustion barrel 43 and enter into the barrel 43 for face-forward nozzle orientation. In yet another alternative embodiment, the feed-lines 41, 41' may terminate with or without a fork into the surface of the combustion barrel 43, with the nozzles disposed on the surface of the inner layer of the barrel 43—and not suspended within the air pocket 45 of the barrel 43. In one embodiment, each of the dedicated feed-lines 41, 41' run parallel and terminate/converge through a top surface of the combustion barrel 43, exposing a distal tip of each of the dedicated feed lines 41, 41' by way of a dispensing outlet or nozzle on the inner top wall of the combustion barrel 43. The ignition means or burner 44 may be disposed on any point of the inner top or side walls or suspended within the center of the pocket 45. In yet another embodiment, the dedicated feed-lines 41, 41' may fork proximal to the combustion barrel 43, wherein each of the dedicated feed-lines 41, 41' terminate into opposable side walls of the combustion barrel 43, such that the exposed dispensing outlet or nozzle for each of the feed-lines 41, 41' oppose one another on the inner side walls of the combustion barrel 43. Again, the ignition means or burner 44 may be disposed on any point of the inner top or side walls or suspended within the center of the pocket 45.

Computer modeling programs demonstrate that optimized parameters, such as pressure, flow rate, and concentrations are required in order to achieve efficient combustion. Additionally, optimized parameters are required to avoid or mitigate for the potential increase in pollutants, such as COx and NOx, that may result from the increased temperature of an oxygen-pure/enriched combustion. As a result, a networked control system for regulating input/output affecting any variety of parameters may be necessary for achieving cleaner and more efficient operation based on any one of a modeling program. This type of regulation or control system may further control staging of the dispensing of feeds or combustion. It is contemplated herein that an automated approach for improving the functioning of sensor inputs, control valve operations, pressure/concentration calculations, and flow-rate management is embodied electronically in one or more computing devices accessible in one or more coupled digital networks, such as processors, controllers, servers, as well as wireless mobile devices such as cellular/smartphones, and various internet-of-things (IOT) type devices enabled with network communication and programmable capability.

Figure 5:
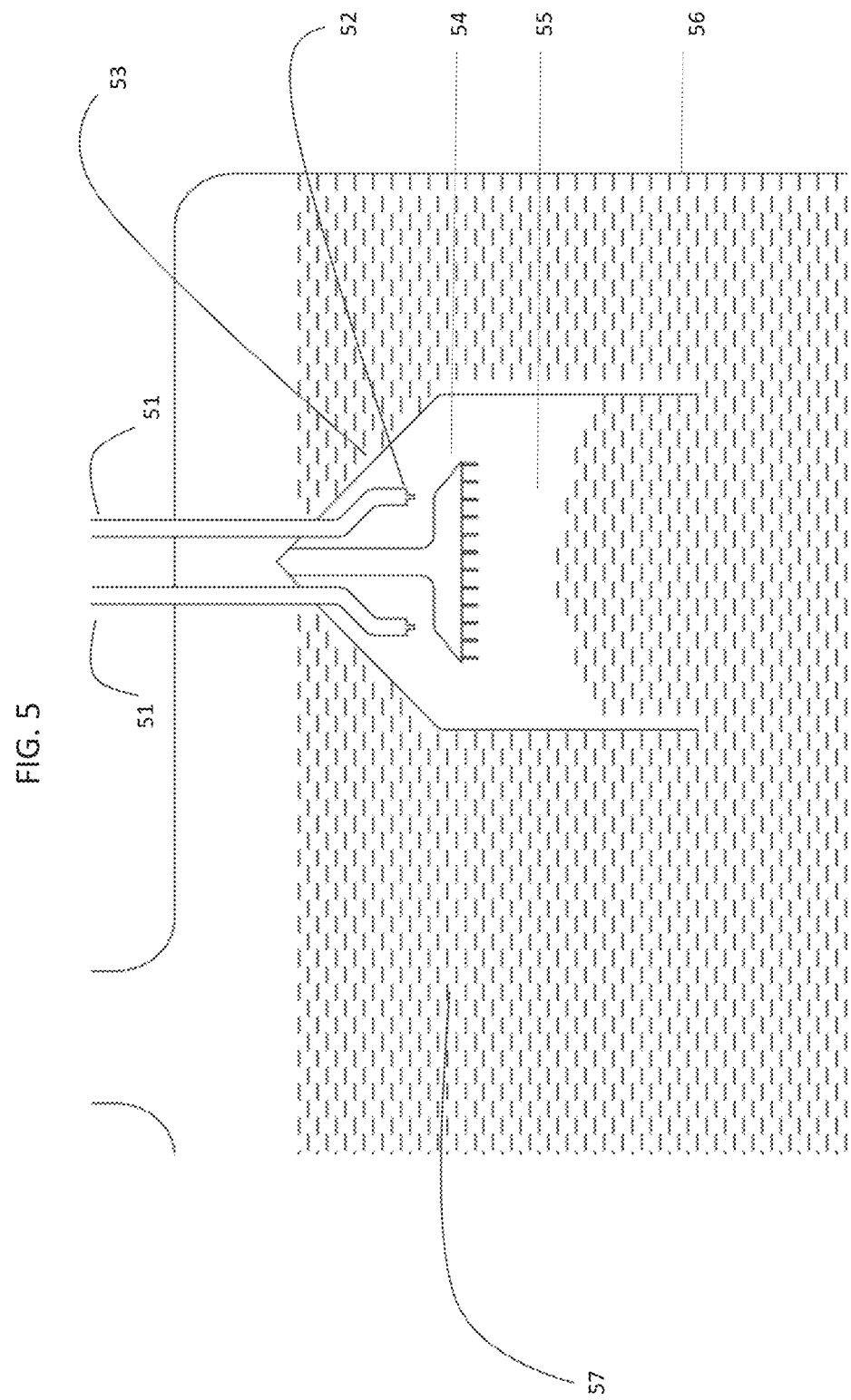
FIG. 5 illustrates an exemplary combustion barrel submersed in a feed-water vessel in accordance with an aspect of the invention.

FIG. 5 illustrates an exemplary combustion barrel submersed in a feed-water vessel in accordance with an aspect of the invention. Illustrated is a combustion system with surface-less heat energy exchange for efficient heat energy capture (thermal efficiency) and lower pollutant emission. The system comprises: a first line 51 (optionally, pressurized) feeding an oxygen-rich reactive (enriched or pure); a second line 51' (optionally, pressurized) feeding a hydrogen fuel; a vessel 56 containing feed-water 57; a combustion barrel 53 without a bottom wall submersed into the feed-water 57 contained in a vessel 56, said combustion barrel 53 configured to receive the (pressurized) feed from each of the first 51 and second line 51' and combust a mixture of the two feeds in a pocket formed between an inner top and side walls of the combustion barrel 53 and a top surface of the feed-water contained in the vessel 56; and said combustion within the pocket yielding a combustion product and by-product directly into the feed-water of the vessel 56. This high temperature and pressure combustion may yield temperatures in the range of 1900-2900 Celsius, along with pressure ranging between 30-60 atm, the equivalent of pressure emitted between a jet and a rocket propulsion.

The combustion barrel 53, burner 54, and outlets/nozzle 52 may be comprised of any high-temperature/pressure resistant material/construction. Additionally, additional layers may be sandwiched between the outer later and inner layer of the combustion barrel 53, in order to provide for increased temperature and pressure resistance. Furthermore, cooling ducts, lines, and/or beds may be interspersed between layers to further cool the barrel 53. An inlet/outlet may also be disposed on the inner layer to allow for pre-heating of the barrel. Peak temperatures can reach up to 2900 Celsius, and therefore require high temperature resistant material and construction—not to mention possibly additional layers and/or interspersed cooling ducts/lines. Optionally, a water inlet/outlet may be disposed within the pocket 55 of the combustion barrel 53 in order to suppress flame temperature if necessary.

Most notably, the bottom surface of the combustion barrel is bottom-less, thereby allowing the entire contents of the combustion (product and by-product) directly into the feed-water, wherein the top surface of the feed-water is within the barrel, yet below the combustion components of the barrel 53, such as the dispensing outlets/nozzles 52 and igniter/burner 54. Such a configuration allows for a wide release of the contents of the combustion directly into the feed-water. The pocket 54 is formed as air is in the barrel 53 is submerged in the feed-water 57 of the vessel 56, the water pressure on the air increases, with the volume of the air pocket 54 shrinking until the pressure in the air is the same as the pressure in the feed-water vessel 57 that surrounds the air and barrel 53. Normally, spent combustion gases are removed or exhausted via a flue or heat exchangers (direct or non-direct), while they still retain a tremendous amount of thermal energy, which is almost all lost and not sequestered. If resulting exhaust gas—by-product of the combustion—is brought to a relatively cooler load, energy will be transferred to the load. More energy will be transferred if the entirety of the exhaust gas is not only in contact with the cooler load, but allowed to diffuse throughout the depth of the feed-water vessel 56. The bottom-less surface and pocket 55 of the combustion barrel 53 enable this to occur, resulting in reducing the surface area/volume of the exhaust gas and eventually leading to a reduction in flue-related heat energy losses. The exhaust gas heat loss is calculated by the equation:

$$W * Cp * (T\text{ exhaust} - T\text{ ambient})$$
$$W = \text{mass of the exhaust gas}$$
$$Cp = \text{specific heat of the exhaust gas}$$
$$T\text{ exhaust} = \text{exhaust gas temperature}$$
$$T\text{ ambient} = \text{ambient temperature}$$

By minimizing the mass/volume of the exhaust gas by virtue of the direct emission and diffusion throughout the feed-water vessel, the overall heat energy loss of the exhaust gas is greatly reduced. A larger portion of the heat energy is sequestered by evaporation of the feed-water (combined with the combustion product) and fed into the steam turbine for power conversion and/or feed-water return. The lack of tubes, walls, or plates to transfer heat energy inevitably result in lower loss of heat energy due to the surfaced nature of these heat exchanger assemblies—resulting in close to perfect thermal efficiency.

Figure 6:
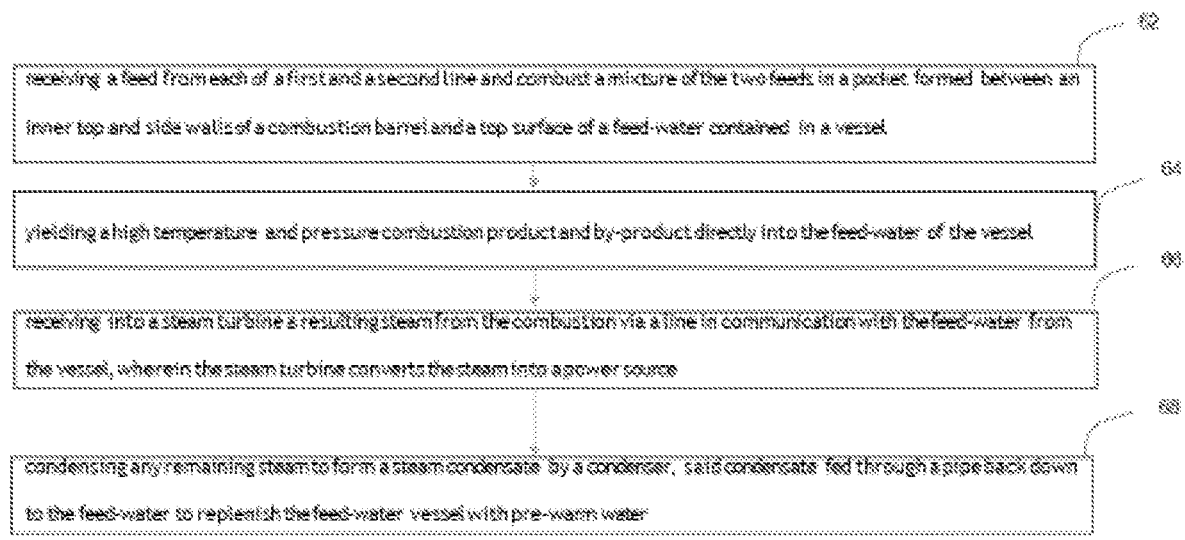
FIG. 6 depicts a flow diagram of a method for a direct emission and diffusion of combustion and exhaust into a feed-water vessel in accordance with an aspect of the invention

Now in reference to FIG. 6. FIG. 6 depicts a flow diagram of a method for a direct emission and diffusion of combustion and exhaust into a feed-water vessel in accordance with an aspect of the invention. The method comprising the steps of: (1) receiving a feed from each of a first and a second line and combust a mixture of the two feeds in a pocket formed between an inner top and side walls of a combustion barrel and a top surface of a feed-water contained in a vessel 62; (2) yielding a high temperature and pressure combustion product and by-product directly into the feed-water of the vessel 64; (3) receiving into a steam turbine a resulting steam from the combustion via a line in communication with the feed-water from the vessel, wherein the steam turbine converts the steam into a power source 66; and (4) condensing any remaining steam to form a steam condensate by a condenser, said condensate fed through a pipe back down to the feed-water to replenish the feed-water vessel with pre-warm water 68.

The cleaner combustion product and cleaner exhaust (flue gas) is directly emitted and diffused in combination into the depths of the feed-water as a result of an enriched or oxy-firing combustion. This combination of combustion product and by-product directly into the feed-water vessel will presumably diffuse out the thermal energy of the flue to combine with the thermal energy of the combustion, forming a thermally efficient energy output in a form of steam that feeds into a power-generating turbine. This direct emission and diffusion method of surface-less thermal exchange does not require the use of surfaced-heat exchangers, presumably leading to lower loss of heat energy during exchange and higher thermal efficiency. While enriched or oxy-firing combustion generally leads to lower exhaust, and more particularly to lower $SO_2$ and NOx emissions, there may be considerable levels of $CO_2$ still remaining in the exhaust, even after diffusion into the feed-water with the combustion product. Consequently, prior to being channeled into the steam turbine for power conversion, the steam from the combustion product and exhaust from the high-pressure combustion of the feed-water may be directed through any means of a post-combustion carbon capture mechanism, such as a solvent-based carbon capture or electrochemical means. The carbon captured steam may be directed through an inbound line into the steam turbine for power generation with the residual steam traveling through an outbound line from the turbine to the condenser to generate condensate to return and replenish the feed-water supply. The uncaptured (residual COx) steam may exit the carbon capture means through an outbound line for exit out of the system into the environment. Alternatively, the uncaptured steam may exit the system for storage.

Foregoing descriptions of specific embodiments of the invention have been presented for purposes of illustration and description. They are not intended to be exhaustive or to limit the invention to the precise forms disclosed. Modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents. It is contemplated herein that automated approach for improving the functioning of sensor inputs, control valve operations, pressure/concentration calculations, and flow-rate management is embodied electronically in one or more computing devices accessible in one or more coupled digital networks, such as processors, controllers, servers, as well as wireless mobile devices such as cellular/smartphones, and various internet-of-things (IOT) type devices enabled with network communication and programmable capability.

I claim:

1. A power generation system comprising:
    a first line feeding an oxygen-rich reactive;
    a second line feeding a hydrogen fuel;
    a vessel containing feed-water;
    a combustion barrel without a bottom wall submerged into the feed water contained in the vessel, said combustion barrel configured to receive the feed from each of the first line and second line and combust a mixture of the two feeds in a pocket formed between an inner top and side walls of the combustion barrel and a top surface of the feed-water contained in the vessel, wherein each of the feeds are atomized and dispensed as a mist spray into the combustion barrel;
    said combustion within the pocket yielding a product and by-product directly into the feed water of the vessel;
    a steam turbine configured to receive a resulting steam from the combustion via a line in communication with the feed-water from the vessel, wherein the steam turbine converts the steam into a power source; and
    a condenser to receive any remaining steam to form a steam condensate, said condensate fed through a pipe back to the feed-water to replenish the feed-water vessel with pre-warm water.

2. The system of claim 1, wherein the oxygen-rich reactive is pure or enriched.

3. The system of claim 1, wherein each of the two feeds is first fed through a condenser to cool the condenser to cool the steam on return.

4. The system of claim 1, wherein the combustion barrel comprises an outlet for each feed disposed on at least one of a top or any side inner wall.

5. The system of claim 1, wherein the combustion barrel further comprises an igniter or burner disposed on at least one of a top wall or any side inner wall of the barrel or suspended within the barrel in such a position for said igniter or burner to spark and make contact with a combination of each of the two feeds.

6. The system of claim 5, wherein the spark in contact with the combination of each of the two feeds are within the pocket of the barrel.

7. A combustion system comprising:
    a first line feeding an oxygen-rich reactive;
    a second line feeding a hydrogen fuel;
    a vessel containing feed-water; and
    a combustion barrel without a bottom wall submerged into the feed water contained in a vessel, said combustion barrel configured to receive the feed from each of the first and second line and combust a mixture of the two feeds in a pocket formed between an inner top and side walls of the combustion barrel and a top surface of the feed-water contained in the vessel, wherein each of the feeds are atomized and dispensed as a mist spray into the combustion barrel and said combustion within the pocket yielding product and by-product directly into the feed water of the vessel.

8. The system of claim 7, wherein the oxygen-rich reactive is pure or enriched.

9. The system of claim 7, wherein each of the two feeds is first fed through a condenser to cool the condenser to cool the steam on return.

10. The system of claim 7, wherein the combustion barrel comprises an outlet for each feed disposed on at least one of a top or any side inner wall.

11. The system of claim 7, wherein the combustion barrel further comprises an igniter or burner disposed on at least one of a top wall or any side inner wall of the barrel or suspended within the barrel in such a position for said igniter or burner to spark and make contact with a combination of each of the two feeds.

12. The system of claim 7, wherein the spark in contact with the combination of each of the two feeds are within the pocket of the barrel.

13. The system of claim 7, further comprising a steam turbine configured to receive a resulting steam from the combustion via a line in communication with the feed-water from the vessel, wherein the steam turbine converts the steam into a power source.

14. The system of claim 7, further comprising a condenser to receive any remaining steam to form a steam condensate, said condensate fed through a pipe back to the feed-water to replenish the feed-water vessel with pre-warm water.

\* \* \* \* \*